Jan. 30, 1923.
T. F. ELLIS.
JACK.
FILED JAN. 29, 1921.
1,443,913.
2 SHEETS—SHEET 1.
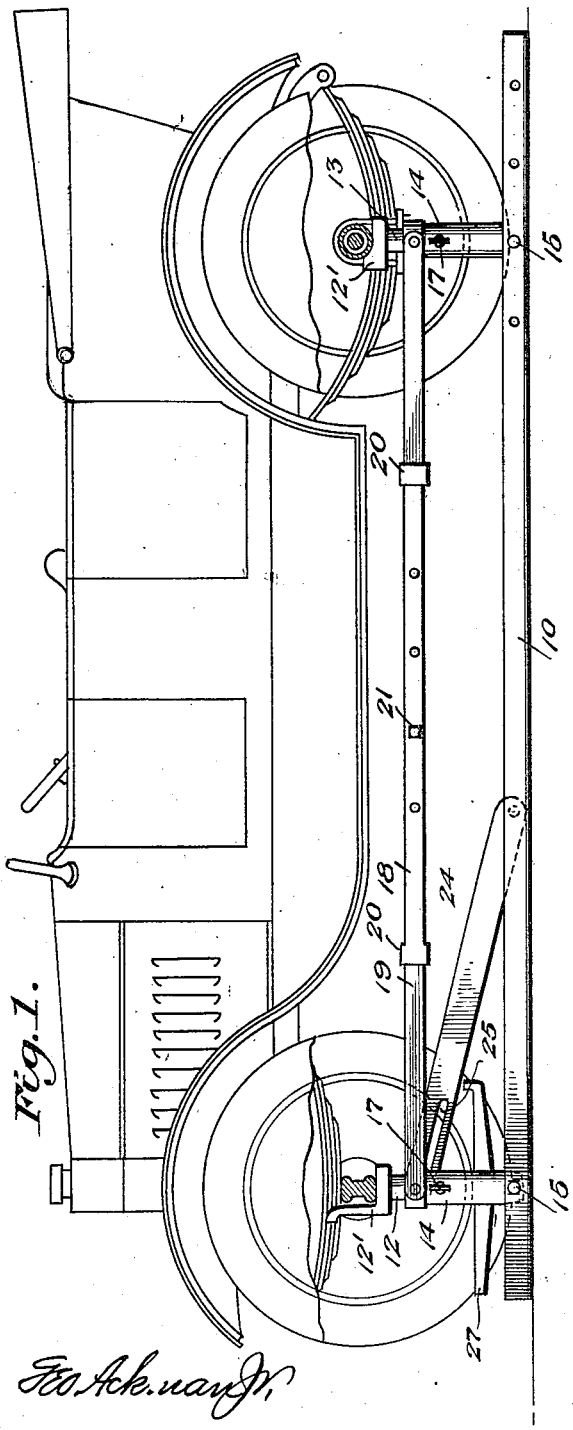
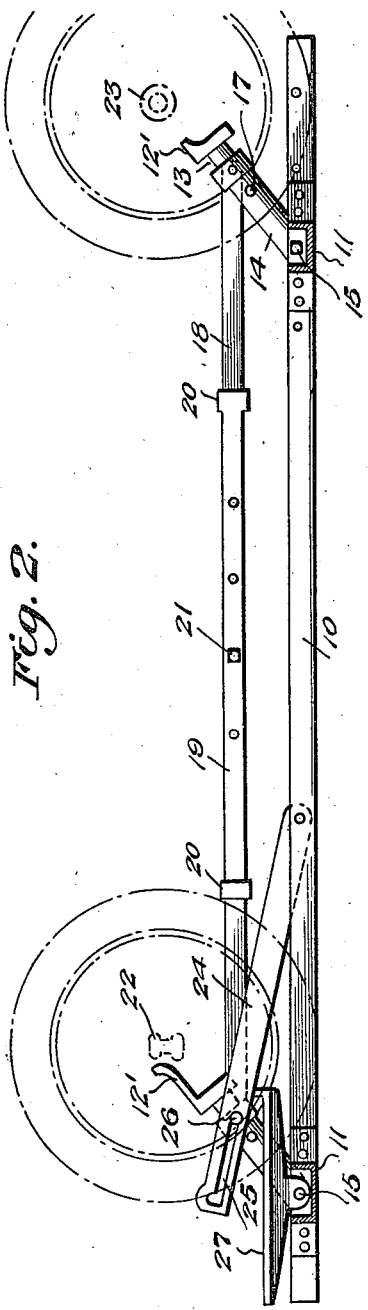
Thomas F. Ellis
INVENTOR Jan. 30, 1923.
T. F. ELLIS.
JACK.
FILED JAN. 29, 1921.
1,443,913.
2 SHEETS—SHEET 2.
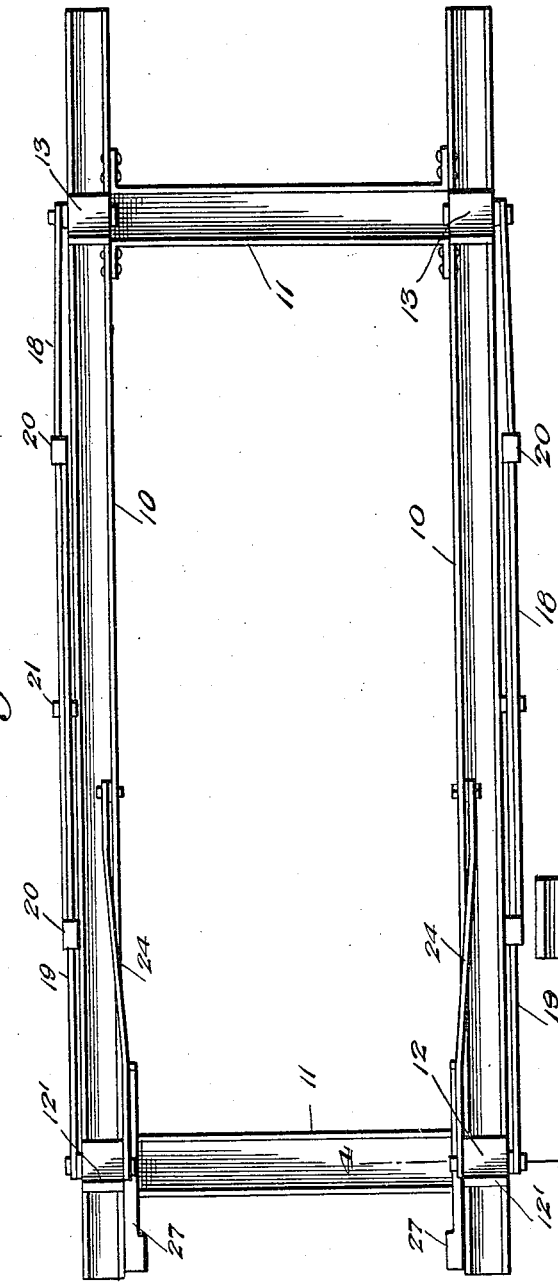
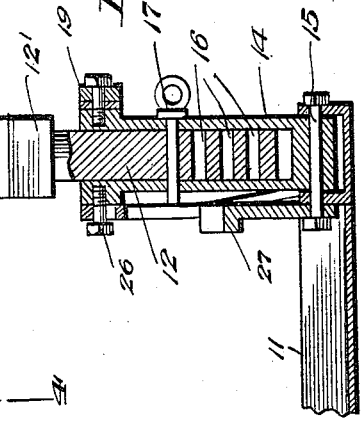
Thomas F. Ellis
INVENTOR
BY Victor J. Evans
ATTORNEY
WITNESS:

Patented Jan. 30, 1923.

1,443,913

UNITED STATES PATENT OFFICE.

THOMAS F. ELLIS, OF MATTSTON, MISSISSIPPI.

JACK.

Application filed January 29, 1921. Serial No. 440,978.

*To all whom it may concern:*

Be it known that I, THOMAS F. ELLIS, a citizen of the United States, residing at Mattston, in the county of Coahoma and State of Mississippi, have invented new and useful Improvements in Jacks, of which the following is a specification.

This invention comprehends the provision of a jack mechanism by means of which all wheels of a motor vehicle are simultaneously elevated from the ground and so supported as to relieve the tires of undue pressure incident to the weight of the vehicle.

In carrying out the invention use is made of a plurality of pivoted uprights normally disposed at an angle to engage the axles of the vehicle when the latter approaches the jack mechanism, and vehicle actuated means for moving the standard to vertical position, during which movement of parts the wheels of the vehicle are elevated in spaced relation to the ground.

Another object of the invention resides in the provision of a jack mechanism which can be adjusted to accommodate itself to cars of different lengths, and wherein the uprights above referred to may be also varied in length so that it may be properly arranged for different size cars.

The nature and advantages of the invention will be better understood when read in connection with the accompanying drawings the invention residing in the combination, construction and arrangement of parts as claimed.

In the drawings forming part of this application, like numerals of reference indicate similar parts in the several views and wherein:

Figure 1 is a side elevation of the invention showing the vehicle supported thereon.

Figure 2 is a view similar to Figure 1 showing the normal position of the mechanism.

Figure 3 is a plan view.

Figure 4 is a sectional view taken on line 4—4 of Figure 3.

The device forming the subject matter of my invention embodies a base frame made up of spaced parallel side members 10 connected by end members 11, these members being preferably of channel-shaped formation in cross section. A pair of uprights are arranged adjacent each end of the frame the uprights of one pair being indicated at 12 while the uprights of the other pair are indicated at 13. Each of the uprights comprises a sleeve-like member 14 which is pivoted as at 15 upon the base frame, while in each sleeve-like member is slidably mounted one of the uprights above referred to. Each upright is provided with a plurality of the transverse bores 16 which are singly brought into alinement with openings in the sleeve 14 to receive a pin 17 for holding the upright at any desired height. Manifestly, by reason of this adjustment all the uprights may be elevated or lowered to accommodate different size cars. The corresponding uprights of each pair are connected by a connecting rod which is preferably made up of two sections 18 and 19 respectively, the adjacent ends of said sections being overlapped and associated by means of clamps 20 designed to provide for sliding movement of said section whereby the link of the connecting rod may be varied. The overlapped portions of the sections of each rod are provided with openings to accommodate a fastening element 21, by means of which the sections are held fixed relatively subsequent to their adjustment. By reason of this construction all of the uprights are moved upon their pivots in unison in a manner for a purpose to be hereinafter described. The uprights 12 are spaced from the uprights 13 a distance equal to the distance between the front and rear axles of the vehicle which the uprights are adapted to support. The upper ends of the respective uprights are designed to accommodate the axles of the vehicle, and are of angular formation as indicated at 12'.

The device forming the subject matter of the invention is adapted for use in show rooms, garages or the like. In practice, the standards 12 and 13 respectively normally assume the position at an inclination to the ground or surface as illustrated in Figure 2, and in which position the upper ends of the uprights are disposed to be engaged by the front and rear axles 22 and 23 respectively of the vehicle to be supported When the motor vehicle engages the uprights, the latter are moved upon their pivots to upright positions such as illustrated in Figure 1, in which position the wheels of the vehicle are supported in spaced relation to the ground or surface. Pivoted to the side members 10 of the base frame are brace members 24, the latter being slotted as at 25 to receive a pin 26 carried by the standards at the front of the device. These braces 24 limit the movement of the standards under the influence of the vehicle, and also assist in affording the device in its entirety strength and rigidity. The slot 25 of the brace elements 24 are slightly offset as shown so as to remain in the position illustrated in Figure 1 when the vehicle is being supported. In order to lower or remove the vehicle from the uprights when desired, it is only necessary to depress upon the foot actuated member 27 which is pivoted upon the base frame immediately beneath the brace elements 24. When the member 27 is depressed the brace elements 24 are slightly elevated to move the pin 26 out of the offset portions of the slot, so that the vehicle can be moved off the standards and the latter moved upon their pivots to their normal positions as illustrated in Figure 2.

While it is believed that from the foregoing description the nature and advantages of the invention will be readily apparent, I desire to have it understood that I do not limit myself to what is hereinshown and described, and that such changes may be restored to when desired as fall within the scope of what is claimed.

What I claim is:

A jack mechanism for vehicles comprising a base frame, front and rear lifting members pivoted to the base and connected together for simultaneous movement, pins projecting from the said front members, a bracing element associated with each front member, said element being pivoted at its lower end to the frame and presenting a guide at its upper end in which the pin of the said member is constrained to move, the said guide having an offset in which the pin is received when the said members are in vertical position, whereby the said members are retained in such position by the said bracing elements, and a lever pivoted to the frame below each bracing element and movable into engagement with the said element for elevating the same to dislodge the pin from the offset of the said guide.

In testimony whereof I affix my signature.

THOMAS F. ELLIS.